March 30, 1926.

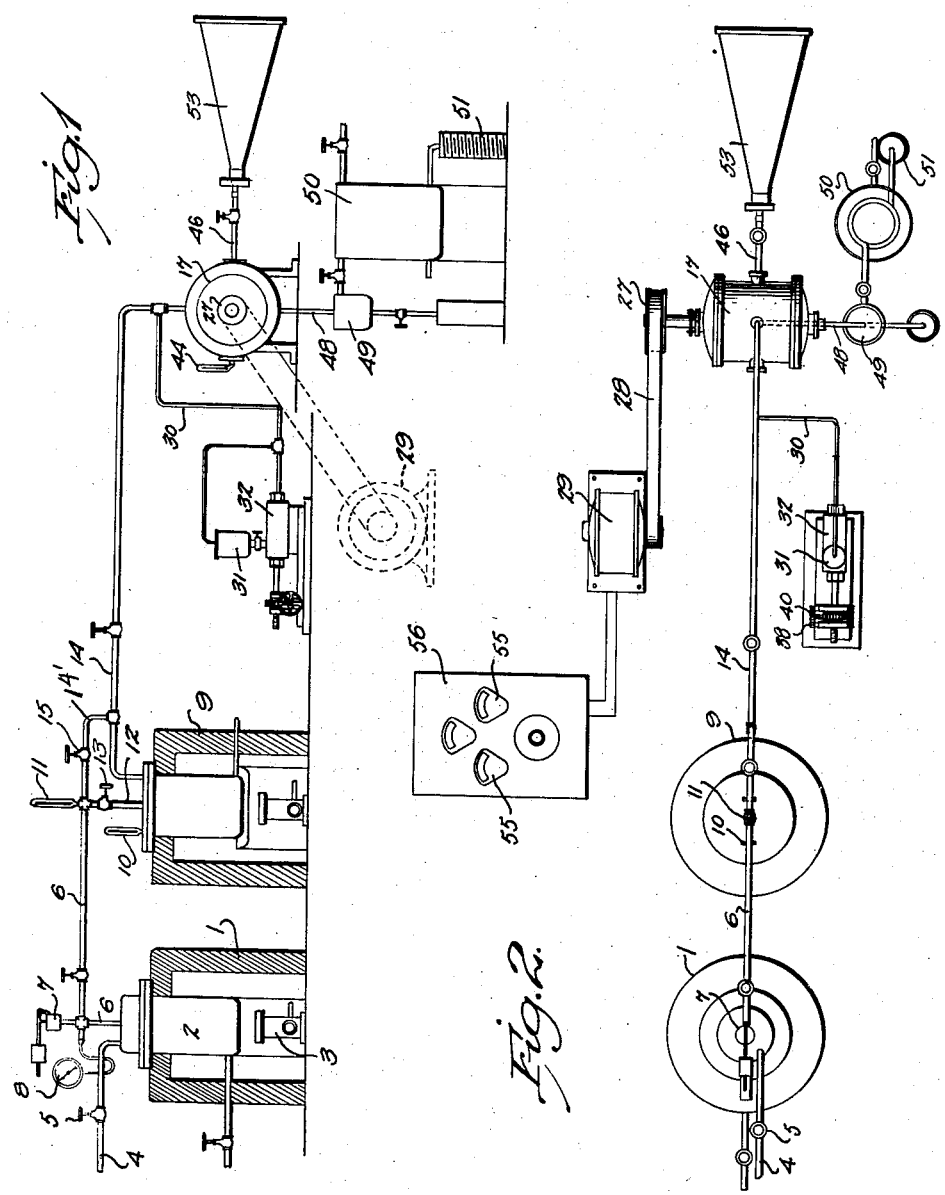

A. HENRIKSEN ET AL 1,578,730

APPARATUS FOR TESTING OILS

Filed Feb. 26, 1924     3 Sheets-Sheet 2

Inventor
ALFRED HENRIKSEN
N. A. STEPHENS
VALENTINE ZBYSHEVSKI

Attorney

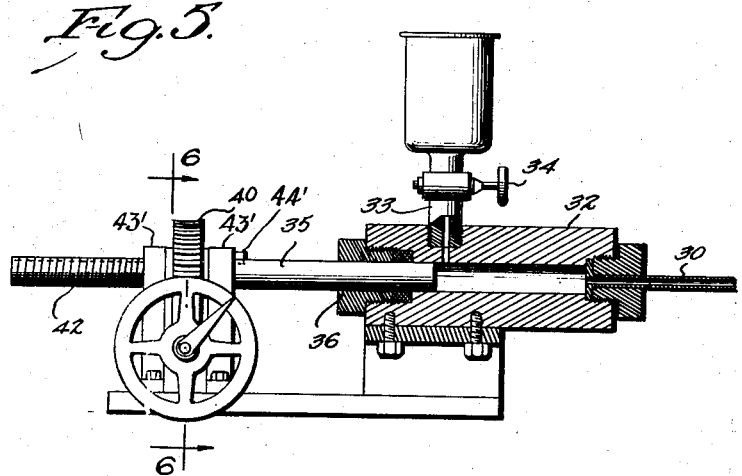
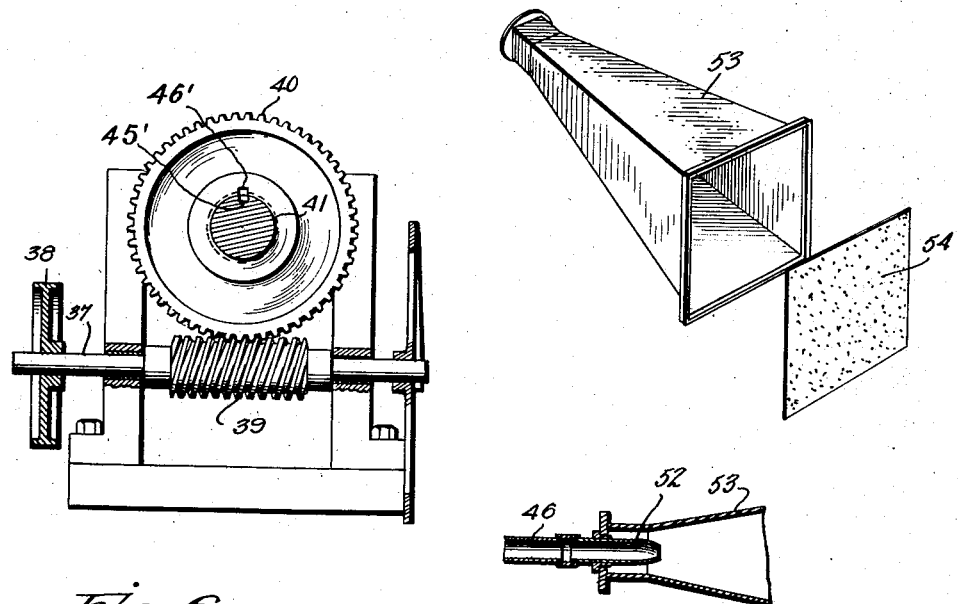

Patented Mar. 30, 1926.

1,578,730

UNITED STATES PATENT OFFICE.

ALFRED HENRIKSEN, NICHOLAS A. STEPHENS, AND VALENTINE ZBYSHEVSKI, OF PONCA CITY, OKLAHOMA.

APPARATUS FOR TESTING OILS.

Application filed February 26, 1924. Serial No. 695,341.

*To all whom it may concern:*

Be it known that we, ALFRED HENRIKSEN, NICHOLAS A. STEPHENS, and VALENTINE ZBYSHEVSKI, citizens of the United States and a citizen of Russia, respectively, residing at Ponca City, in the county of Kay and State of Oklahoma, have invented certain new and useful Improvements in Apparatus for Testing Oils, of which the following is a specification.

This invention relates to apparatus for testing oils, and more particularly to means for determining the quality of steam cylinder oils under conditions approximating those existing in the cylinder of a steam engine.

An object of the invention is the provision of a simple and accurate machine for testing the quality and efficiency of steam cylinder oils under conditions similar to those existing in an engine cylinder.

A further object of the invention is the provision of a machine for testing the efficiency of an oil under various conditions of pressure, steam temperature, and speed of piston and to provide a scientific basis for the testing of the quality of lubricating oils expressed in a special lubricating oil coefficient for given conditions of pressure, temperature and speed.

A further object is the provision of means to determine the atomization of the oil as well as its lubricating efficiency.

In the accompanying drawings, we have shown one embodiment of the invention. In this showing:

Figure 1 is a diagrammatic side elevation, parts being shown in section,

Figure 2 is a diagrammatic plan view,

Figure 5 is a detail view of an oil pump.

Figure 6 is a sectional view on line 6—6 of Figure 5,

Figure 7 is a perspective view of the apparatus employed for atomizing the oil, and, Figure 8 is a detail view of an exhaust used in connection therewith.

Figure 3:
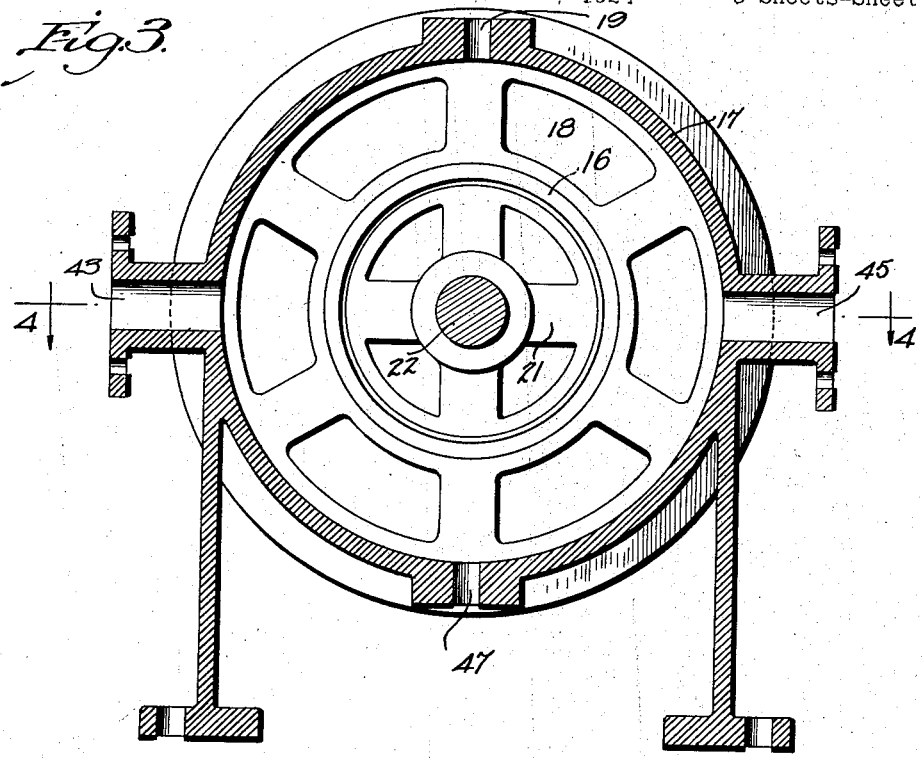
Figure 3 is a transverse vertical sectional view of the testing cylinder.
Figure 4:
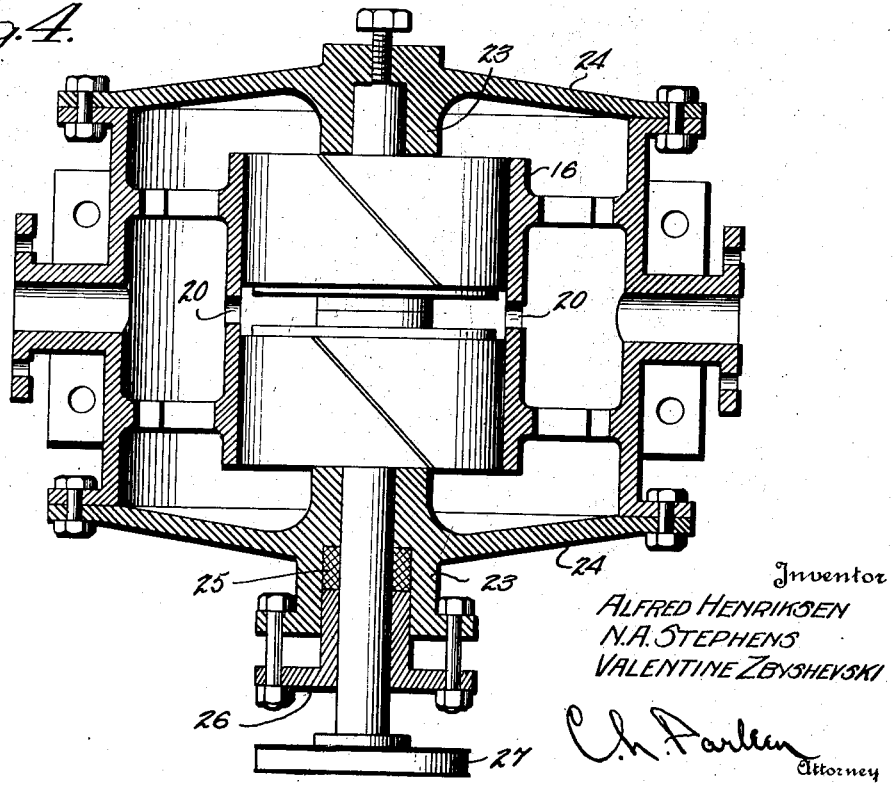
Figure 4 is a horizontal sectional view on line 4—4 of Figure 3.

Referring to Figures 1 and 2 of the drawings, the reference numeral 1 designates a steam boiler consisting of an outer casing and provided with a steam drum 2. Suitable heating means 3 are arranged in the bottom of the casing. Cold water is fed to the boiler through a pipe 4 having a control valve 5, and the boiler is provided with an outlet pipe 6. A safety valve 7 and a pressure gage 8 of the usual construction may be connected to this outlet pipe. The outlet pipe is connected to a superheater 9, similar in construction to the steam boiler. The superheater is provided with a thermometer 10 and a thermometer 11 may be arranged in the outlet pipe 6 of the boiler adjacent the point where it is connected to the superheater. As shown, the pipe 6 is connected to the superheater by a pipe 12, having a valve 13 arranged therein. The superheater is provided with an outlet pipe 14, as shown. The pipe 6 is connected to the outlet pipe 14 of the superheater by means of an extension 14'. A valve 15 is arranged in this extension. By closing the valve 13 and opening the valve 15, the steam from the boiler may be by-passed around the superheater and saturated steam employed for testing the oil. The pipe 14 is connected to the testing apparatus. The testing apparatus consists of a cylinder 16, the detail construction of which is shown in Figures 3 and 4 of the drawings. The cylinder is surrounded by an outer casing 17, forming a steam jacket 18. An inlet opening 19 is provided in the casing 17 and the pipe 14 is connected to this opening. The cylinder 16 is provided with openings 20 communicating with the steam jacket through which the steam, or steam and oil in the steam jacket, pass into the cylinder. A plurality of drums 21 are mounted on a shaft 22 within the cylinder. The surface of the drums is provided with seated rings similar to the rings of the pistons of steam engines. As shown, the ends of the cylinder are open and the shaft is journaled in bearings 23, carried by cylinder heads 24 which are bolted to the outer casing. One end of the shaft projects through the cylinder head and is provided with suitable packing 25 retained in position by a packing nut 26. This end of the shaft is provided with a pulley 27, adapted to receive a belt 28 driven from any suitable source of power, such as an electric motor 29 (see Figure 2).

Referring again to Figures 1 and 2 of the drawings, the pipe 14 is connected to an oil pipe 30. Oil is pumped from a suitable container 31 by means of a suitable pump 32, the detail construction of which is shown in Figures 5 and 6 of the drawings, to the pipe 14. As shown, the container is provided with an outlet 33 at the bottom having a control valve 34 arranged therein. This outlet communicates with the interior of the pump cylinder 32. A plunger 35 is mounted in the cylinder, the plunger extending through a suitable packing gland 36. The oil pipe 30 extends through a similar packing gland at the other end of the cylinder. Any suitable means may be employed for driving the pump. In the drawings, we have shown a drive shaft 37, having a pulley 38 mounted thereon, adapted to be connected to any suitable source of power (not shown) and further provided with a worm 39 to drive the pump at a relatively low speed. The worm 39 meshes with a worm gear 40, having a central threaded opening 41. As shown, the outer end of the plunger is threaded as at 42 whereby revolution of the worm wheel will feed the plunger into the cylinder. The plunger shaft extends through suitable bearings 43' arranged on opposite sides of the worm wheel and is prevented from rotating with the worm wheel by a key 44' received in alined key-ways 45' and 46' in the plunger shaft and the bearing respectively. The plunger may be returned to its original position by any suitable means, as by revolving the shaft 37 and pulley 38 in the opposite direction.

Referring to Figures 3 and 4 of the drawings, the casing 17 is further provided with an opening 43 adapted to receive a coupling to the other end of which is connected a thermometer 44, as shown in Figure 1 of the drawings. The opposite side of the casing is provided with an opening 45 communicating with a pipe 46, and the bottom of the casing is provided with an opening 47, communicating with a pipe 48. This pipe extends downwardly to a steam trap 49 and the steam trap is connected to a condenser 50. The steam passing through the condenser is condensed and measured in a graduated cylinder 51.

The pipe 46 extending from the casing of the testing cylinder is connected to a nozzle 52 (see Figure 8) arranged within a flaring container 53. The end of this container is adapted to be closed by a sheet of filter paper or other testing sheet upon which the oil is sprayed.

The electric motor 29 is connected to suitable registering instruments 55, arranged on a board 56 adjacent the motor. These instruments may be the usual volt meter, ammeter, and the like, for testing the consumed current.

The operation of the apparatus is as follows:

Given a lineal speed of the drum 21, for instance, 700 feet per minute, the same conditions can be created in the testing cylinder as are present in the cylinders of a steam engine. The testing cylinder and the steam jacket 18 are filled with steam at the desired temperature and pressure and the power to drive the testing apparatus measured in watts or kilowatts. A predetermined quantity of oil in grams per liter of steam is then introduced from the pump 32, through the pipe 30 and the power then required to drive the testing cylinder at a given speed is measured. The ratio between the power required to drive without oil and the power required to drive at the same speed with oil, multiplied by the coefficient of the apparatus will determine the coefficient of lubrication. At the same time, the valve in the pipe 46 may be opened and a picture of the atomization of the oil obtained on the special sheet 54 arranged in the casing 53. If decomposition of the oil is taking place, the paper will show large spots of carbon, tar, and similar substances whereas if the oil properly atomizes, it will be very finely distributed over the paper.

It is to be understood that the form of our invention herewith shown and described is to be taken as a preferred example of the same, and that various changes in the shape, size, and arrangement of parts may be resorted to without departing from the spirit of the invention or the scope of the subjoined claims.

We claim:

1. In an apparatus for testing the lubricating qualities of oil for steam engines, a testing cylinder, a driven member arranged in said cylinder, and adapted to be driven at a predetermined speed, means for delivering steam to said cylinder, and means for delivering predetermined quantities of oil thereto.

2. In an apparatus for testing the lubricating qualities of oil for steam engines, a testing cylinder, a driven member arranged in said cylinder, and adapted to be driven at a predetermined speed, means for delivering steam to said cylinder, means for controlling the temperature and pressure in said cylinder, and means for delivering predetermined quantities of oil thereto.

3. In an apparatus for testing the lubricating qualities of oil for steam engines, a testing cylinder, a driven member arranged in said cylinder, and adapted to be driven at a predetermined speed, means for delivering steam to said cylinder, means for controlling the temperature and pressure in said cylinder, means for delivering predetermined quantities of oil thereto, and means for determining the power required to drive said member.

4. In an apparatus for testing the lubricating qualities of oil for steam engines, a testing cylinder, a drum mounted in said cylinder, means for delivering steam to said cylinder, means for delivering oil thereto in predetermined quantities, and means for determining the power required to drive said drum.

5. In an apparatus for testing the lubricating qualities of oil for steam engines, a testing cylinder, a drum mounted in said cylinder, means for delivering steam to said cylinder, means for delivering oil thereto in predetermined quantities, means for determining the power required to drive said drum, means for withdrawing a portion of the mixed oil and steam from said cylinder, and means for atomizing said withdrawn oil and steam.

6. In an apparatus for testing the lubricating qualities of oil for steam engines, a testing cylinder, a steam jacket surrounding said cylinder, a drum mounted in said cylinder, means for rotating said drum, means for feeding steam to said steam jacket and means for feeding oil thereto in predetermined quantities.

In testimony whereof we affix our signatures.

ALFRED HENRIKSEN.
NICHOLAS A. STEPHENS.
VALENTINE ZBYSHEVSKI.